(12) United States Patent
Onuma et al.

(10) Patent No.: US 10,079,396 B2
(45) Date of Patent: Sep. 18, 2018

(54) SOLID-OXIDE FUEL CELL SYSTEM AND METHOD OF STOPPING SAME

(71) Applicants: PANASONIC CORPORATION, Osaka (JP); TOTO LTD., Fukuoka (JP)

(72) Inventors: Shigenori Onuma, Kyoto (JP); Yasushi Kaneko, Osaka (JP); Kunihiro Ukai, Nara (JP); Akinori Yukimasa, Osaka (JP); Yosuke Akagi, Fukuoka (JP); Takeshi Saito, Fukuoka (JP)

(73) Assignees: PANASONIC CORPORATION, Osaka (JP); TOTO LTD., Fukuoka (JP)

( * ) Notice: Subject to any disclaimer, the term of this patent is extended or adjusted under 35 U.S.C. 154(b) by 138 days.

(21) Appl. No.: 15/306,443

(22) PCT Filed: Feb. 9, 2015

(86) PCT No.: PCT/JP2015/000581
§ 371 (c)(1),
(2) Date: Oct. 24, 2016

(87) PCT Pub. No.: WO2015/182018
PCT Pub. Date: Dec. 3, 2015

(65) Prior Publication Data
US 2017/0047601 A1  Feb. 16, 2017

(30) Foreign Application Priority Data
May 28, 2014 (JP) .................. 2014-109674

(51) Int. Cl.
*H01M 8/04228* (2016.01)
*H01M 8/1231* (2016.01)
(Continued)

(52) U.S. Cl.
CPC ... *H01M 8/04228* (2016.02); *H01M 8/04303* (2016.02); *H01M 8/04753* (2013.01);
(Continued)

(58) Field of Classification Search
CPC .......... H01M 8/04228; H01M 8/1231; H01M 8/04303; H01M 8/04753; H01M 8/0662; H01M 8/0675; H01M 8/04776
See application file for complete search history.

(56) References Cited

U.S. PATENT DOCUMENTS

2010/0261082 A1  10/2010  Kajiwara et al.
2012/0183875 A1   7/2012  Yumita
(Continued)

FOREIGN PATENT DOCUMENTS

EP  3147979 A1    3/2017
JP  2002-246053 A 8/2002
(Continued)

OTHER PUBLICATIONS

International Search Report and Written Opinion issued in International Patent Application No. PCT/JP2015/000581, dated Apr. 7, 2015; with English translation.
(Continued)

*Primary Examiner* — Oi K Conley
(74) *Attorney, Agent, or Firm* — McDermott Will & Emery LLP

(57) ABSTRACT

A solid-oxide fuel cell system includes: a fuel cell unit including a solid-oxide fuel cell including an anode gas channel and a cathode gas channel and a mixer; an electric power generation raw material supplier; a combustible gas channel extending from the electric power generation raw material supplier to a downstream end of the anode gas channel; an oxidizing gas supplier; and a controller operative to, after electric power generation of the fuel cell unit is stopped, control the electric power generation raw material supplier to supply to the combustible gas channel the electric power generation raw material, the amount of which compensates for contraction of gas in the combustible gas channel due to temperature decrease of the fuel cell unit and (Continued)

1 SOLID-OXIDE FUEL CELL SYSTEM also control the oxidizing gas supplier to supply the oxidizing gas to the cathode gas channel in accordance with the supply of the electric power generation raw material.

8 Claims, 10 Drawing Sheets

(51) Int. Cl.
*H01M 8/04746* (2016.01)
*H01M 8/0662* (2016.01)
*H01M 8/04303* (2016.01)
*H01M 8/124* (2016.01)

(52) U.S. Cl.
CPC ....... *H01M 8/0662* (2013.01); *H01M 8/0675* (2013.01); *H01M 8/1231* (2016.02); *H01M 8/04776* (2013.01); *H01M 2008/1293* (2013.01)

(56) References Cited

U.S. PATENT DOCUMENTS

| | | |
|---|---|---|
| 2013/0266879 A1 | 10/2013 | Ono et al. |
| 2013/0273445 A1 | 10/2013 | Kobayashi |
| 2014/0308596 A1 | 10/2014 | Ibuka et al. |
| 2015/0044587 A1 | 2/2015 | Matsuo et al. |

FOREIGN PATENT DOCUMENTS

| | | |
|---|---|---|
| JP | 2003-104707 A | 4/2003 |
| JP | 2003-157875 A | 5/2003 |
| JP | 2005-350300 A | 12/2005 |
| JP | 2006-210019 A | 8/2006 |
| JP | 2008-010348 A | 1/2008 |
| JP | 2008-198534 A | 8/2008 |
| JP | 2010-238417 A | 10/2010 |
| JP | 2011-204559 A | 10/2011 |
| JP | 2012-134046 A | 7/2012 |
| JP | 2013-030489 A | 2/2013 |
| JP | 2013-165042 A | 8/2013 |
| JP | 2013-186945 A | 9/2013 |
| WO | 2011/010365 A1 | 1/2011 |
| WO | 2013/001753 A1 | 1/2013 |
| WO | 2013/035312 A1 | 3/2013 |
| WO | 2013/069632 A1 | 5/2013 |
| WO | 2013/153944 A1 | 10/2013 |

OTHER PUBLICATIONS

Extended European Search Report dated Apr. 18, 2017 issued in European Patent Application No. 15799588.7.

SOLID-OXIDE FUEL CELL SYSTEM AND METHOD OF STOPPING SAME

RELATED APPLICATIONS

This application is the U.S. National Phase under 35 U.S.C. § 371 of International Patent Application No. PCT/JP2015/000581, filed on Feb. 9, 2015, which in turn claims the benefit of Japanese Application No. 2014-109674, filed on May 28, 2014, the disclosures of which Applications are incorporated by reference herein.

TECHNICAL FIELD

The present disclosure relates to a solid-oxide fuel cell system and a method of stopping the solid-oxide fuel cell system.

BACKGROUND ART

PTL 1 describes that in a solid-oxide fuel cell system, when a gas in a reformer contracts due to a temperature decrease of the reformer, a raw material is supplied to the reformer.

PTL 2 describes that in a solid-oxide fuel cell system, an off gas that is a mixture of a fuel gas and an oxidizing gas which have not been used in a solid-oxide fuel cell is subjected to a combustion treatment.

PTL 3 describes that after electric power generation of a solid-oxide fuel cell system is stopped, a fuel gas and air are continuously supplied to a fuel cell stack.

CITATION LIST

Patent Literature

PTL 1: International Publication No. 2013/001753
PTL 2: Japanese Laid-Open Patent Application Publication No. 2013-030489
PTL 3: International Publication No. 2013/069632

SUMMARY OF INVENTION

Technical Problem

In view of the above circumstances, a non-limiting, illustrative embodiment provides a solid-oxide fuel cell system having higher durability than conventional fuel cell systems.

Solution to Problem

One aspect of a solid-oxide fuel cell system of the present disclosure includes: a fuel cell unit including a solid-oxide fuel cell including an anode gas channel and a cathode gas channel and a mixer operative to mix an anode off gas discharged from the anode gas channel and a cathode off gas discharged from the cathode gas channel; an electric power generation raw material supplier operative to supply an electric power generation raw material to the fuel cell unit; a combustible gas channel extending from the electric power generation raw material supplier to a downstream end of the anode gas channel; an oxidizing gas supplier operative to supply an oxidizing gas to the cathode gas channel; and a controller operative to, after electric power generation of the fuel cell unit is stopped, control the electric power generation raw material supplier to supply to the combustible gas channel the electric power generation raw material, the amount of which compensates for contraction of a gas in the combustible gas channel due to temperature decrease of the fuel cell unit and also control the oxidizing gas supplier to supply the oxidizing gas to the cathode gas channel in accordance with the supply of the electric power generation raw material.

Advantageous Effects of Invention

According to the aspect of the present disclosure, the solid-oxide fuel cell system can be made higher in durability than conventional fuel cell systems.

DESCRIPTION OF EMBODIMENTS

Figure 1:
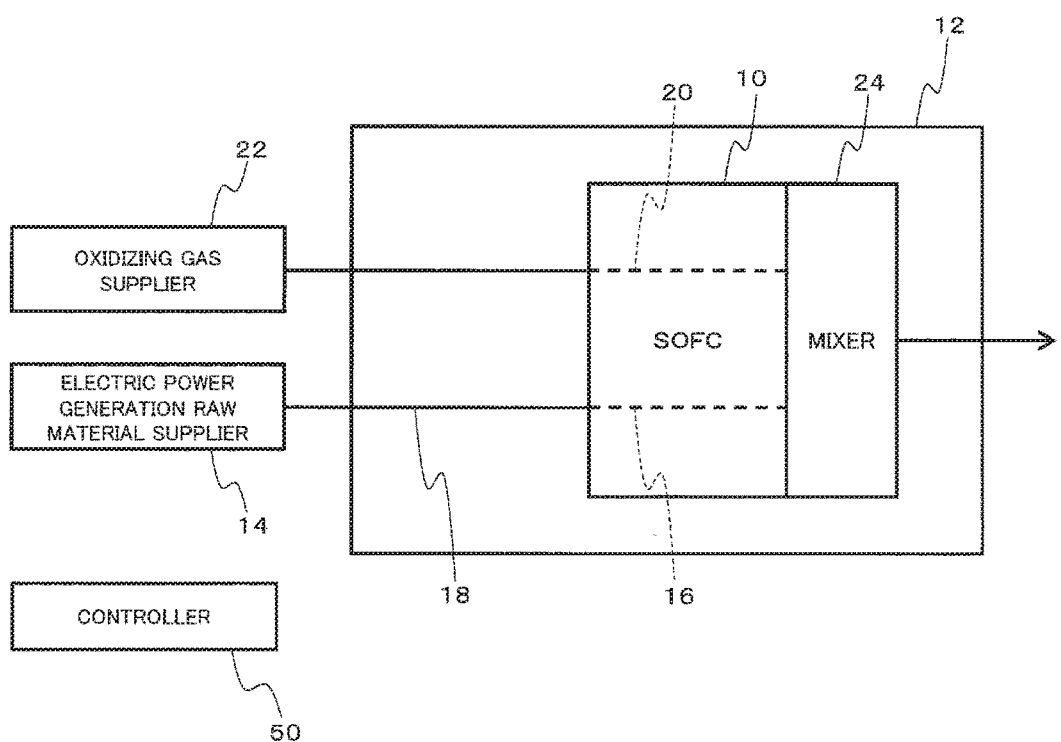
FIG. 1 is a block diagram showing one example of a schematic configuration of a solid-oxide fuel cell system according to Embodiment 1.

The present inventors have diligently studied to improve the durability of the solid-oxide fuel cell system. As a result, the present inventors have obtained the following findings.

PTL 1 describes that in a solid-oxide fuel cell system, a gas in a reformer contracts due to a temperature decrease of the reformer. Further, it is assumed that a gas in a gas channel of a solid-oxide fuel cell also contracts. When the gas in an anode gas channel contracts due to the temperature decrease of the solid-oxide fuel cell, air may flow from outside into the anode gas channel that is open to the atmosphere. The solid-oxide fuel cell is operated at a high temperature of about 600° C. Therefore, when outside air flows into the solid-oxide fuel cell, the solid-oxide fuel cell may be adequately high in temperature (300° C. or more, for example). If an anode contacts the air under such a high temperature circumstance, the anode may oxidize. If start-up and stop of the solid-oxide fuel cell system are repeatedly performed, an oxidation reduction of the anode is repeatedly caused, and therefore, expansion and contraction of the anode are repeatedly caused. This causes, for example, a crack of an electrolyte by application of stress to the electrolyte contacting a fuel electrode, peeling of an interface between the electrolyte and the fuel electrode, or a decrease in effective electrode area by agglomeration of catalyst metal of the anode. Thus, fuel cell performance may significantly deteriorate.

Therefore, it is assumed that the amount of air flowing into the anode gas channel is reduced by supplying a raw material to the anode gas channel in accordance with the temperature decrease of the solid-oxide fuel cell. Here, if a fuel gas and an oxidizing gas which have not been used in the solid-oxide fuel cell are mixed with each other as in PTL 2 described above, a combustible gas discharged from the anode gas channel due to the supply of an electric power generation raw material to the anode gas channel may flow into a cathode gas channel of the solid-oxide fuel cell. If the combustible gas flows into the cathode gas channel of the solid-oxide fuel cell, reduction deterioration of the cathode may occur.

Here, the present inventors have arrived at a configuration in which in the solid-oxide fuel cell system, after electric power generation of a fuel cell unit is stopped, an electric power generation raw material supplier is controlled to supply to a combustible gas channel an electric power generation raw material, the amount of which compensates for the contraction of the gas in the combustible gas channel due to the temperature decrease of the fuel cell unit, and an oxidizing gas supplier is controlled to supply the oxidizing gas to the cathode gas channel in accordance with the supply of the electric power generation raw material.

According to this configuration, a possibility that the air flows into the anode at the time of the stop can be made lower than conventional cases, and the degree of the reduction deterioration of the cathode by the combustible gas having flowed into the cathode gas channel in accordance with the supply of the electric power generation raw material to the anode gas channel can be reduced. Therefore, the durability of the solid-oxide fuel cell system can be improved.

Hereinafter, embodiments of the present disclosure will be explained in reference to the attached drawings.

Each of the embodiments explained below is one specific example of the present disclosure. Numerical values, shapes, materials, components, positions and connection states of the components, steps, orders of the steps, and the like are just examples and do not limit the present invention. Among components in the embodiments below, components that are not recited in an independent claim showing a most generic concept of the present disclosure will be explained as optional components. Explanations of components with the same reference sign in the drawings may not be repeated. For ease of understanding, the components in the drawings are schematically shown, and shapes, size ratios, and the like may not be shown accurately. Regarding a manufacturing method, the order of steps and the like may be changed according to need, and publicly known steps may be added.

Embodiment 1

A solid-oxide fuel cell system of Embodiment 1 includes: a fuel cell unit including a solid-oxide fuel cell including an anode gas channel and a cathode gas channel and a mixer operative to mix an anode off gas discharged from the anode gas channel and a cathode off gas discharged from the cathode gas channel; an electric power generation raw material supplier operative to supply an electric power generation raw material to the fuel cell unit; a combustible gas channel extending from the electric power generation raw material supplier to a downstream end of the anode gas channel; an oxidizing gas supplier operative to supply an oxidizing gas to the cathode gas channel; and a controller operative to, after electric power generation of the fuel cell unit is stopped, control the electric power generation raw material supplier to supply to the combustible gas channel the electric power generation raw material, the amount of which compensates for contraction of a gas in the combustible gas channel due to temperature decrease of the fuel cell unit and also control the oxidizing gas supplier to supply the oxidizing gas to the cathode gas channel in accordance with the supply of the electric power generation raw material.

A method of stopping a solid-oxide fuel cell system includes the steps of: stopping electric power generation of a fuel cell unit including a solid-oxide fuel cell; and when a channel extending from an electric power generation raw material supplier to a downstream end of an anode gas channel of the solid-oxide fuel cell is a combustible gas channel and after electric power generation of the fuel cell unit is stopped, supplying to the combustible gas channel an electric power generation raw material, the amount of which compensates for contraction of a gas in the combustible gas channel due to temperature decrease of the fuel cell unit and also supplying an oxidizing gas to a cathode gas channel of the solid-oxide fuel cell in accordance with the supply of the electric power generation raw material.

According to this configuration, the durability of the solid-oxide fuel cell system can be improved.

In the above solid-oxide fuel cell system, after the electric power generation of the fuel cell unit is stopped, the controller may control the electric power generation raw material supplier and the oxidizing gas supplier to intermittently supply the electric power generation raw material and the oxidizing gas.

According to this configuration, since the electric power generation raw material is intermittently supplied to the combustible gas channel plural times, the contraction of the gas in the combustible gas channel due to the temperature decrease of the fuel cell unit can be timely compensated.

In the above solid-oxide fuel cell system, after the electric power generation of the fuel cell unit is stopped, the mixer may mix the oxidizing gas and the electric power generation raw material, and the controller may control the electric power generation raw material supplier or the oxidizing gas supplier such that an amount of electric power generation raw material supplied becomes an amount by which a concentration of the electric power generation raw material in the mixer is outside a combustible range.

In the above solid-oxide fuel cell system, after the electric power generation of the fuel cell unit is stopped, the controller may control the electric power generation raw material supplier such that a volume of the electric power generation raw material supplied to the combustible gas channel becomes not more than a volume of the combustible gas channel.

In the above solid-oxide fuel cell system, the controller may control the oxidizing gas supplier such that a volume of the oxidizing gas supplied to the cathode gas channel after the electric power generation of the fuel cell unit is stopped becomes not less than a volume of the cathode gas channel.

According to this configuration, the durability of the solid-oxide fuel cell system can be further effectively improved.

Device Configuration

FIG. 1 is a block diagram showing one example of a schematic configuration of the solid-oxide fuel cell system according to Embodiment 1. Hereinafter, a solid-oxide fuel cell system 1 of Embodiment 1 will be explained in reference to FIG. 1.

In an example shown in FIG. 1, the solid-oxide fuel cell system 1 includes a fuel cell unit 12, an electric power generation raw material supplier 14, a combustible gas channel 18, an oxidizing gas supplier 22, and a controller 50. The fuel cell unit 12 includes a solid-oxide fuel cell 10 and a mixer 24.

The solid-oxide fuel cell 10 includes an anode gas channel 16 and a cathode gas channel 20. The solid-oxide fuel cell 10 may generate electric power using an electric power generation raw material itself or may generate electric power using a reformed gas obtained by reforming the electric power generation raw material by a reformer or the like.

The solid-oxide fuel cell 10 includes, for example, an anode and a cathode and may perform an electric power generating reaction between a hydrogen-containing gas supplied to the anode and an oxidizing gas supplied to the cathode. The hydrogen-containing gas may be supplied from the reformer (not shown). The oxidizing gas is, for example, air.

The reformer may generate the hydrogen-containing gas using the raw material. Specifically, the hydrogen-containing gas may be generated by a reforming reaction of the raw material gas in the reformer. The reforming reaction may be any type of reaction, and examples thereof include a steam-reforming reaction, an autothermal reaction, and a partial oxidation reaction.

The reformer is configured such that, for example, a reforming catalyst is filled in a container. The reforming catalyst is, for example, an alumina carrier impregnated with at least one of nickel, ruthenium, platinum, and rhodium. However, the reforming catalyst is not limited to this and may be any material as long as the reforming catalyst can promote the reforming reaction when the reforming catalyst is maintained in an optimal temperature range.

Although not shown in FIG. 1, devices necessary for the reforming reaction may be suitably provided. For example, when the reforming reaction is the steam-reforming reaction, a combustor that heats the reformer and an evaporator that generates steam may be provided. A fuel of the combustor may be any fuel. For example, the hydrogen-containing gas discharged from the reformer may be used. A heat source for generating the steam is not especially limited. The heat source may be, for example, a combustor, an electric heater, a reformer, a fuel cell, or any combination thereof. When the reforming reaction is the autothermal reaction or the partial oxidation reaction, an air supplier (not shown) that supplies air to the reformer may be further provided.

For example, the solid-oxide fuel cell 10 includes a stack configured such that a plurality of single cells each of which generates electric power by an electric power generating reaction between the anode and the cathode are serially connected to one another. The solid-oxide fuel cell 10 may include a stack configured such that cylindrical cells are serially connected to one another. The stack may be a sealed type stack by which an anode off gas and a cathode off gas are discharged without being mixed with each other or may be an open type stack by which the anode off gas and the cathode off gas are mixed with each other and are then discharged. In the case of the open type stack, the anode off gas and the cathode off gas may be combusted after these gases are mixed by a mixer provided immediately behind the stack.

For example, the single cell may adopt a publicly known configuration that uses yttria stabilized zirconia (YSZ) as an electrolyte or the like. Examples of the material of the single cell include ytterbium, zirconia doped with scandium, and lanthanum gallate solid electrolyte. According to the single cell using yttria stabilized zirconia, the electric power generating reaction is performed in a temperature range of about 600 to 1,000° C. although it also depends on the thickness of the electrolyte.

The electric power generated by the electric power generation of the solid-oxide fuel cell 10 is supplied to an external load through a terminal, not shown.

The mixer 24 mixes the anode off gas discharged from the anode gas channel 16 and the cathode off gas discharged from the cathode gas channel 20. For example, in a space outside the stack configured such that the cylindrical cells are serially connected to one another, the mixer 24 may be provided in the vicinity of a gas outlet port. Or, for example, in the space outside the stack configured such that the cylindrical cells are serially connected to one another, the mixer 24 may be a portion where a gas flowing outside the stack and a gas discharged from the stack through the gas outlet port are mixed with each other. The mixer 24 may be a combustor. Or, a combustor may be provided downstream of the mixer 24.

The electric power generation raw material supplier 14 supplies the electric power generation raw material to the fuel cell unit. The electric power generation raw material supplier 14 is constituted by, for example, a booster and a flow rate control valve but may be constituted by any one of the booster and the flow rate control valve. The booster is, for example, a fixed displacement pump but is not limited to this. The electric power generation raw material is supplied from an electric power generation raw material supply source. The electric power generation raw material supply source may have predetermined supply pressure. Examples of the electric power generation raw material supply source having the predetermined supply pressure include a raw material gas bomb and a raw material gas infrastructure.

The electric power generation raw material may be a substance containing an organic compound whose constituent elements are at least carbon and hydrogen. Specific examples of the electric power generation raw material include: hydrocarbons, such as a hydrogen gas, a natural gas, a city gas, a LPG, a LNG, a propane gas, a butane gas, and a gas containing methane as a major component; alcohols, such as methanol and ethanol; and kerosene. The city gas is a gas supplied from a gas company through pipes to homes and the like. In the case of using the liquid-type electric power generation raw material such as kerosene or alcohol, the electric power generation raw material may be heated and vaporized before the electric power generation raw material is supplied to the reformer.

The combustible gas channel 18 is a channel extending from the electric power generation raw material supplier 14 to a downstream end of the anode gas channel 16.

The oxidizing gas supplier 22 supplies the oxidizing gas to the cathode gas channel 20. The oxidizing gas supplier 22 may be, for example, a sirocco fan or the like. The oxidizing gas may be, for example, air.

After the electric power generation of the fuel cell unit 12 is stopped, the controller 50 controls the electric power generation raw material supplier 14 to supply to the combustible gas channel 18 the electric power generation raw material, the amount of which compensates for the contraction of the gas in the combustible gas channel 18 due to the temperature decrease of the fuel cell unit 12, and also controls the oxidizing gas supplier 22 to supply the oxidizing gas to the cathode gas channel 20 in accordance with the supply of the electric power generation raw material.

Regarding the above wording "in accordance with the supply of the electric power generation raw material", the supply of the oxidizing gas is only required to be executed in accordance with the supply of the electric power generation raw material such that the degree of the reduction deterioration of the cathode by the combustible gas having flowed into the cathode gas channel in accordance with the supply of the electric power generation raw material to the anode gas channel is made lower than conventional cases. Specifically, a period in which the supply of the electric power generation raw material is executed and a period in which the supply of the oxidizing gas is executed may at least partially overlap each other. Further, as long as the reduction deterioration of the cathode is suppressed, the supply of the oxidizing gas may be executed after the supply of the electric power generation raw material. These two periods do not have to overlap each other. The supply of the electric power generation raw material and the supply of the oxidizing gas may be continued before stopping the electric power generation.

According to the above control, even if the gas in the combustible gas channel 18 contracts due to the temperature decrease of the fuel cell unit 12 after the electric power generation of the fuel cell unit 12 is stopped, the electric power generation raw material is supplied to the combustible gas channel 18. Therefore, the oxidizing gas is less likely to flow backward to the combustible gas channel 18, and the possibility of the deterioration of the anode by oxidation can be reduced.

According to the configuration of Embodiment 1, for performing purging using air, it is unnecessary to additionally provide an air supplier for reforming.

When the electric power generation raw material is supplied to the combustible gas channel 18 after the electric power generation of the fuel cell unit 12 is stopped, the electric power generation raw material may flow out from the combustible gas channel 18 to the mixer 24. If the electric power generation raw material contacts the cathode in the cathode gas channel 20 through the mixer 24, the deterioration of the cathode by the reduction may occur. According to the above control, even if the electric power generation raw material flows out from the combustible gas channel 18 to the mixer 24, the oxidizing gas is supplied to the cathode gas channel 20, so that the electric power generation raw material is less likely to contact the cathode. Therefore, the possibility of the deterioration of the cathode by the reduction can be reduced.

It should be noted that after the electric power generation of the fuel cell unit 12 is stopped, the mixer 24 may mix the oxidizing gas and the electric power generation raw material, and the controller 50 may control the electric power generation raw material supplier 14 or the oxidizing gas supplier 22 such that the amount of electric power generation raw material supplied becomes an amount by which a concentration of the electric power generation raw material in the mixer 24 is outside a combustible range. For example, the flow rate of the electric power generation raw material or the flow rate of the oxidizing gas may be controlled such that the concentration of the electric power generation raw material in a space of the mixer 24 becomes lower than the combustible range.

The controller 50 is only required to have a control function and includes a calculation processing portion and a storage portion storing a control program. Examples of the controller 50 include a microcontroller and a PLC (Programmable Logic Controller). Examples of the calculation processing portion include a MPU and a CPU. One example of the storage portion is a memory. The controller 50 may be constituted by a single controller that performs centralized control or may be constituted by a plurality of controllers that cooperate to perform distributed control.

After the electric power generation of the fuel cell unit 12 is stopped, the controller 50 may control the electric power generation raw material supplier 14 and the oxidizing gas supplier 22 to intermittently supply the oxidizing gas and the electric power generation raw material. For example, for every predetermined change in the temperature of the fuel cell unit 12, a desired amount of electric power generation raw material and a desired amount of oxidizing gas may be intermittently supplied to the combustible gas channel 18 and the cathode gas channel 20, respectively.

According to this configuration, since the electric power generation raw material is intermittently supplied to the combustible gas channel 18 plural times, the contraction of the gas in the combustible gas channel 18 due to the temperature decrease of the fuel cell unit 12 can be timely compensated.

After the electric power generation of the fuel cell unit 12 is stopped, the controller 50 may control the electric power generation raw material supplier 14 such that a volume of the electric power generation raw material supplied to the combustible gas channel 18 becomes not more than a volume of the combustible gas channel 18. The supply of the electric power generation raw material, the volume of which is not more than the volume of the combustible gas channel 18, to the combustible gas channel 18 may be performed only once or may be intermittently performed plural times as described above.

The controller 50 may control the oxidizing gas supplier 22 such that the volume of the oxidizing gas supplied to the cathode gas channel 20 after the electric power generation of the fuel cell unit 12 is stopped becomes not less than the volume of the cathode gas channel 20.

According to this control, even if the combustible gas flow out from the combustible gas channel 18 to the mixer 24, an adequate amount of oxidizing gas is supplied to the cathode gas channel 20, so that the combustible gas is further less likely to contact the cathode. Therefore, the possibility of the reduction deterioration of the cathode by the combustible gas can be more effectively reduced.

It should be noted that, for example, when or after the electric power generation raw material is supplied to the combustible gas channel 18, the controller 50 controls the oxidizing gas supplier 22 to supply the oxidizing gas to the cathode gas channel 20 such that the volume of the oxidizing gas supplied becomes not less than the volume of the cathode gas channel 20. It is desirable that, for example, the controller 50 supply the oxidizing gas to the cathode gas channel 20 when the electric power generation raw material is supplied to the combustible gas channel 18. When the supply of the oxidizing gas to the cathode gas channel 20 is started after the electric power generation raw material is supplied to the combustible gas channel 18, the combustible gas having flowed out from the combustible gas channel 18 to the mixer 24 during the supply of the electric power generation raw material may flow into the cathode gas channel 20. If the combustible gas flows into the cathode gas channel 20, the reduction deterioration of the cathode may be caused by the combustible gas.

When the temperature of the solid-oxide fuel cell 10 is not less than 100° C. and not more than 300° C. after the electric power generation of the fuel cell unit 12 is stopped, the controller 50 may start the supply of the electric power generation raw material to the combustible gas channel 18. A lower limit of the temperature range may be set to, for example, reduce the possibility of generation of condensed water. Or, for example, when nickel is used in the anode electrode of the solid-oxide fuel cell 10, the lower limit of the temperature range may be set to reduce the possibility of catalyst deterioration. An upper limit of the temperature range may be set to, for example, reduce the possibility of a decrease in catalyst performance of a desulfurizer, a reformer, and a fuel cell by carbon deposition and the possibility of clogging of a combustible gas channel by carbon deposition.

When the temperature of the solid-oxide fuel cell 10 is not less than 120° C. and not more than 160° C. after the electric power generation of the fuel cell unit 12 is stopped, the controller 50 may start the supply of the electric power generation raw material to the combustible gas channel 18.

To reduce the possibility of the catalyst deterioration, the lower limit of the temperature range may be set to 150° C.

To reduce the possibility of the carbon deposition, the upper limit of the temperature range may be set to 400° C.

When the temperature of the solid-oxide fuel cell 10 is decreased to a predetermined temperature after the electric power generation of the fuel cell unit 12 is stopped, the controller 50 may stop the supply of the electric power generation raw material to the combustible gas channel 18. The predetermined temperature may be, for example, 150° C., 120° C., or 100° C.

The temperature of the solid-oxide fuel cell 10 may be indirectly obtained by, for example, detecting the temperature of the gas flowing through the combustible gas channel 18.

A desulfurizer that removes a sulfur compound contained in the electric power generation raw material may be disposed on the combustible gas channel 18 extending from the electric power generation raw material supplier 14 to the solid-oxide fuel cell 10. When a reformer is disposed on the combustible gas channel 18 extending from the electric power generation raw material supplier 14 to the solid-oxide fuel cell 10, the desulfurizer that removes the sulfur compound contained in the electric power generation raw material may be disposed on the combustible gas channel 18 extending from the electric power generation raw material supplier 14 to the reformer.

The sulfur compound may be an odorant component added to the raw material on purpose or a natural sulfur compound derived from the raw material itself. Specific examples of the sulfur compound include: tertiary-butylmercaptan (TBM); dimethyl sulfide (DMS); tetrahydrothiophene (THT); carbonyl sulfide (COS); and hydrogen sulfide.

The desulfurizer may be a hydro-desulfurizer or a normal temperature desulfurizer.

The hydro-desulfurizer is configured such that a hydrodesulfurizing agent is filled in a container. Used as the hydrodesulfurizing agent is, for example, a CuZn-based catalyst having both a function of converting the sulfur compound into hydrogen sulfide and a function of adsorbing the hydrogen sulfide. However, the hydrodesulfurizing agent is not limited to this and may be constituted by: a CoMo-based catalyst that converts the sulfur compound of the raw material gas into the hydrogen sulfide; and a ZnO-based catalyst or CuZn-based catalyst that is provided downstream of the CoMo-based catalyst and is a sulfur adsorbent which adsorbs and removes the hydrogen sulfide.

The hydrodesulfurizing agent may contain nickel (Ni) as catalyst metal. In this case, if the raw material and a recycled gas are supplied to the hydrodesulfurizing agent when the hydro-desulfurizer is low in temperature (less than 150° C., for example) before warming-up, the catalyst may deteriorate. To reduce the possibility of the catalyst deterioration, the temperature of the hydrodesulfurizing agent in the desulfurizer may be detected using a temperature detector, not shown, and the electric power generation raw material may be supplied to the hydro-desulfurizer only when the temperature of the hydrodesulfurizing agent in the desulfurizer is not less than a predetermined temperature.

The normal temperature desulfurizer removes the sulfur compound in the raw material at normal temperature. The wording "normal temperature" is used since it is close to a normal temperature range relative to a use temperature (about 300° C., for example) of the hydro-desulfurizer. The wording "normal temperature" denotes a range from the normal temperature range up to a temperature at which the desulfurizing agent used herein effectively serves as a desulfurizing agent.

When the hydrodesulfurizing agent contains copper and zinc, an appropriate operating temperature range of the hydro-desulfurizer is, for example, about 150 to 350° C. In the case of an adsorption desulfurizing agent, an Ag zeolite-based catalyst or the like is used, and the desulfurizer is used at normal temperature.

Stopping Method

Figure 2:
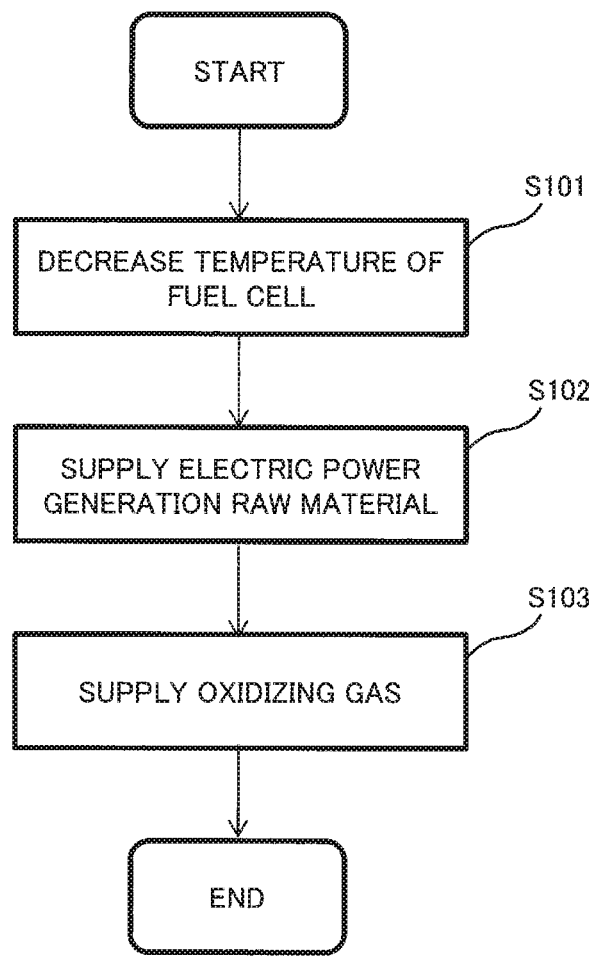
FIG. 2 is a flow chart showing one example of a method of stopping the solid-oxide fuel cell system according to Embodiment 1.

FIG. 2 is a flow chart showing one example of a method of stopping the solid-oxide fuel cell system according to Embodiment 1. Hereinafter, the method of stopping the solid-oxide fuel cell system according to Embodiment 1 will be explained in reference to FIG. 2. The stopping method shown in FIG. 2 may be executed in such a manner that, for example, the controller 50 controls the electric power generation raw material supplier 14 and the oxidizing gas supplier 22.

When the electric power generation of the fuel cell unit 12 is stopped (START), the temperature of the fuel cell unit 12 decreases (Step S101), and the electric power generation raw material supplier 14 supplies to the combustible gas channel 18 the electric power generation raw material, the amount of which compensates for the contraction of the gas in the combustible gas channel 18 due to the temperature decrease (Step S102). Further, in accordance with the supply of the electric power generation raw material to the combustible gas channel 18, the oxidizing gas supplier 22 supplies the oxidizing gas to the cathode gas channel 20 (Step S103). Then, the stop operation terminates (END).

The order of the supply of the electric power generation raw material (Step S102) and the supply of the oxidizing gas (Step S103) is not especially limited. The latter may be started before the former, or both the former and the latter may be started simultaneously.

Example 1

Figure 3:
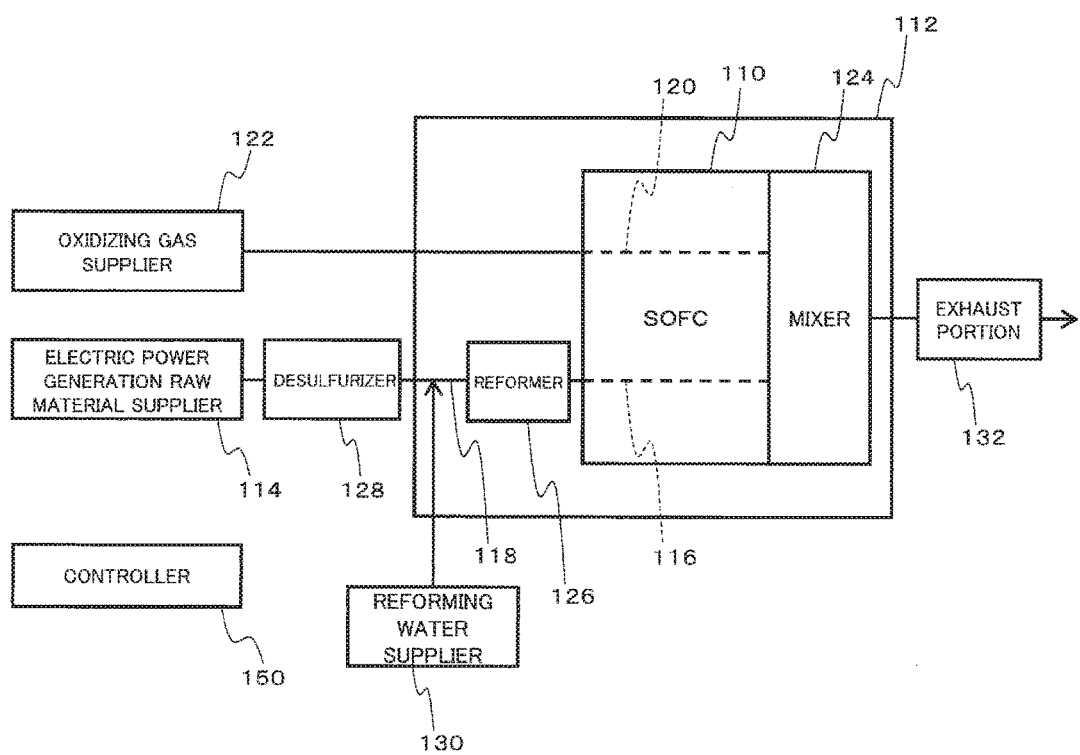
FIG. 3 is a block diagram showing a schematic configuration of the solid-oxide fuel cell system according to Example 1.

FIG. 3 is a block diagram showing a schematic configuration of the solid-oxide fuel cell system according to Example 1. Hereinafter, a solid-oxide fuel cell system 100 according to Example 1 will be explained in reference to FIG. 3.

In an example shown in FIG. 3, the solid-oxide fuel cell system 100 includes a fuel cell unit 112, an electric power generation raw material supplier 114, a desulfurizer 128, a combustible gas channel 118, an oxidizing gas supplier 122, a reforming water supplier 130, an exhaust portion 132, and a controller 150. The fuel cell unit 112 includes a solid-oxide fuel cell 110, a mixer 124, and a reformer 126.

The reformer 126 may generate the hydrogen-containing gas by using the raw material. Specifically, the hydrogen-containing gas may be generated by the reforming reaction of the raw material gas in the reformer 126. The reforming reaction may be any type of reaction, and examples thereof include a steam-reforming reaction, an autothermal reaction, and a partial oxidation reaction.

The reforming water supplier 130 supplies water necessary for the reforming reaction in the reformer 126. One example of the water is ion-exchanged city water.

Although not shown in FIG. 3, devices necessary for the reforming reaction may be suitably provided. For example, when the reforming reaction is the steam-reforming reaction, a combustor that heats the reformer 126 and an evaporator that generates steam may be provided. A fuel of the combustor may be any fuel. For example, the hydrogen-containing gas discharged from the reformer 126 may be used. A heat source for generating the steam is not especially limited. The heat source may be, for example, a combustor, an electric heater, a reformer, a fuel cell, or any combination thereof. When the reforming reaction is the autothermal reaction or the partial oxidation reaction, an air supplier (not shown) that supplies air to the reformer 126 may be further provided.

The desulfurizer 128 is a normal temperature desulfurizer that removes the sulfur compound in the raw material at normal temperature. The desulfurizer 128 may be provided outside the fuel cell unit 112. Since the normal temperature desulfurizer may be the same in configuration as the normal temperature desulfurizer described in Embodiment 1, a detailed explanation thereof is omitted.

The exhaust portion 132 discharges an exhaust gas discharged from the mixer 124.

Except for the above, the solid-oxide fuel cell 110, the mixer 124, the fuel cell unit 112, the electric power generation raw material supplier 114, the desulfurizer 128, the combustible gas channel 118, the oxidizing gas supplier 122, and the controller 150 may be the same in configuration as the solid-oxide fuel cell 10, the mixer 24, the fuel cell unit 12, the electric power generation raw material supplier 14, the combustible gas channel 18, the oxidizing gas supplier 22, and the controller 50, respectively. Therefore, detailed explanations of these components are omitted.

Figure 4:
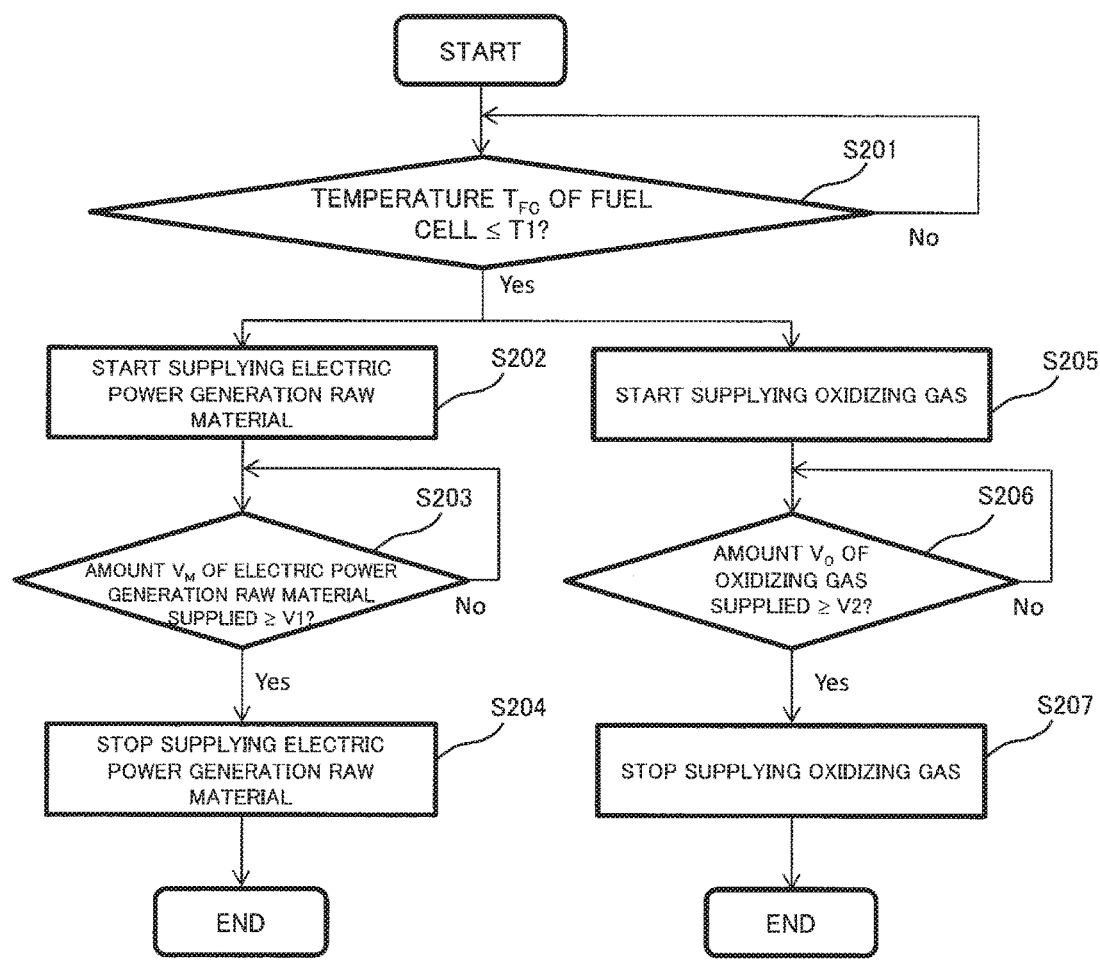
FIG. 4 is a flow chart showing the method of stopping the solid-oxide fuel cell system according to Example 1.

FIG. 4 is a flow chart showing one example of the method of stopping the solid-oxide fuel cell system according to Example 1. Hereinafter, the method of stopping the solid-oxide fuel cell system according to Example 1 will be explained in reference to FIG. 4. The stopping method shown in FIG. 4 may be executed in such a manner that, for example, the controller 150 controls the electric power generation raw material supplier 114 and the oxidizing gas supplier 122.

When the electric power generation of the fuel cell unit 112 is stopped (START), the supply of the electric power generation raw material and the supply of the oxidizing gas are stopped. Specifically, for example, the stop of the electric power generation may be stop of extraction of the electric power from the fuel cell unit 112. After a predetermined period of time (several minutes, for example) since the stop of the supply of the electric power generation raw material, the supply of the oxidizing gas may be stopped.

Then, when a temperature $T_{FC}$ of the solid-oxide fuel cell 110 becomes not more than a temperature T1 (Yes in Step S201), the supply of the electric power generation raw material to the combustible gas channel 118 by the electric power generation raw material supplier 114 is started (Step S202), and the supply of the oxidizing gas to a cathode gas channel 120 by the oxidizing gas supplier 122 is started (Step S205). It should be noted that the order of the start of the supply of the electric power generation raw material and the start of the supply of the oxidizing gas is not especially limited.

After that, when an amount $V_M$ of electric power generation raw material supplied becomes not less than an amount V1 (Yes in Step S203), the supply of the electric power generation raw material is stopped (Step S204). The amount V1 may be a predetermined threshold that is not more than the volume of an anode gas channel 116 of the solid-oxide fuel cell 110 or may be a predetermined threshold that is not more than the volume of the combustible gas channel 118. For example, the amount $V_M$ of electric power generation raw material supplied may be calculated from an operation amount output to the electric power generation raw material supplier 114 and an accumulated time. When the electric power generation raw material is a liquid, the amount of electric power generation raw material supplied may be the volume of a gas obtained by vaporizing the electric power generation raw material.

Further, when an amount $V_O$ of oxidizing gas supplied becomes not less than an amount V2 (Yes in Step S206), the supply of the oxidizing gas is stopped (Step S207). The amount V2 may be a predetermined threshold that is not less than the volume of the cathode gas channel 120 of the solid-oxide fuel cell 110. For example, the amount $V_O$ of oxidizing gas supplied may be calculated from an operation amount output to the oxidizing gas supplier 122 and an accumulated time.

At least one of the determination (Step S203) regarding the amount $V_M$ and the determination (Step S206) regarding the amount $V_O$ may be performed using a physical quantity correlated to the amount ($V_M$ or $V_O$). One example of the physical quantity may be a time elapsed since the start of the supply.

When the supply of the electric power generation raw material and the supply of the oxidizing gas are stopped, the stop operation terminates (END).

It should be noted that, for example, until the temperature $T_{FC}$ of the solid-oxide fuel cell 110 becomes lower than a predetermined temperature, the supply of the electric power generation raw material in Steps S202 to S204 and the supply of the oxidizing gas in Steps S205 to S207 may be repeatedly performed. The supply of the electric power generation raw material in Steps S202 to S204 may be repeatedly performed while continuing the supply of the oxidizing gas.

Embodiment 2

The solid-oxide fuel cell system of Embodiment 2 is configured such that in the solid-oxide fuel cell system of Embodiment 1, the controller controls the oxidizing gas supplier to keep on supplying the oxidizing gas to the cathode gas channel even after the supply of the electric power generation raw material to the combustible gas channel is stopped after the electric power generation of the fuel cell unit is stopped.

According to this configuration, the durability of the solid-oxide fuel cell system can be improved.

Device Configuration

The solid-oxide fuel cell system of Embodiment 2 may be the same in device configuration as the solid-oxide fuel cell system 1 of Embodiment 1 shown in FIG. 1 except for the operations of the controller. Therefore, the same reference signs and names are used for the components that are common between Embodiments 1 and 2, and detailed explanations thereof are omitted.

Stopping Method

Figure 5:
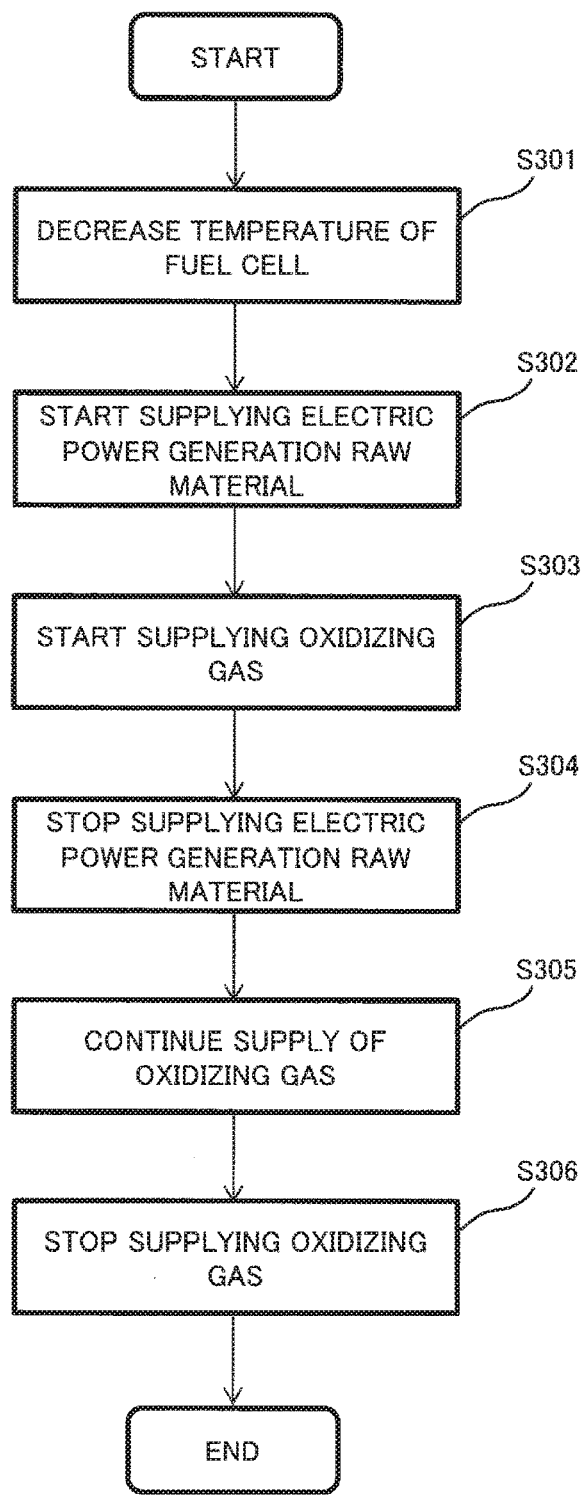
FIG. 5 is a flow chart showing one example of the method of stopping the solid-oxide fuel cell system according to Embodiment 2.

FIG. 5 is a flow chart showing one example of the method of stopping the solid-oxide fuel cell system according to Embodiment 2. Hereinafter, the method of stopping the solid-oxide fuel cell system according to Embodiment 2 will be explained in reference to FIG. 5. The stopping method shown in FIG. 5 may be executed in such a manner that, for example, the controller 50 controls the electric power generation raw material supplier 14 and the oxidizing gas supplier 22.

When the electric power generation of the fuel cell unit 12 is stopped (START), the temperature of the fuel cell unit 12 decreases (Step S301), and the electric power generation raw material supplier 14 starts supplying to the combustible gas channel 18 the electric power generation raw material, the amount of which compensates for the contraction of the gas in the combustible gas channel 18 due to the temperature decrease (Step S302). Further, in accordance with the supply of the electric power generation raw material to the combustible gas channel 18, the oxidizing gas supplier 22 starts the supply of the oxidizing gas to the cathode gas channel 20 (Step S303).

After that, when a predetermined condition is satisfied, the supply of the electric power generation raw material is stopped (Step S304), but the supply of the oxidizing gas is continued (Step S305). The predetermined condition in Step S304 may be, for example, a condition that the amount of electric power generation raw material supplied reaches a predetermined threshold. The predetermined threshold in this case may be a predetermined threshold that is not more than the volume of the anode gas channel 16 of the solid-oxide fuel cell 10 or may be a predetermined threshold that is not more than the volume of the combustible gas channel 18. For example, the amount of electric power generation raw material supplied may be calculated from an operation amount output to the electric power generation raw material supplier 14 and an accumulated time.

After that, when a predetermined condition is satisfied, the supply of the oxidizing gas is stopped (Step S306). Then, the stop operation terminates (END). The predetermined condition in Step S306 may be, for example, a condition that the amount of oxidizing gas supplied reaches a predetermined threshold. The predetermined threshold in this case may be a predetermined threshold that is not less than the volume of the cathode gas channel 120 of the solid-oxide fuel cell 110. For example, the amount of oxidizing gas supplied may be calculated from an operation amount output to the oxidizing gas supplier 22 and an accumulated time.

The order of the start of the supply of the electric power generation raw material (Step S302) and the start of the supply of the oxidizing gas (Step S303) is not especially limited. The latter may be started before the former, or both the former and the latter may be started simultaneously.

Embodiment 2 may be modified in the same manner as Embodiment 1.

Embodiment 3

The solid-oxide fuel cell system of Embodiment 3 is configured such that in the solid-oxide fuel cell system of Embodiment 1 or 2, the fuel cell unit includes a hydro-desulfurizer operative to remove a sulfur compound in the electric power generation raw material supplied from the electric power generation raw material supplier.

According to this configuration, the possibility of the oxidation of the desulfurization catalyst by intrusion of air into the hydro-desulfurizer at the time of the stop can be reduced. Therefore, the durability of the solid-oxide fuel cell system including the hydro-desulfurizer can be improved.

Device Configuration

Figure 6:
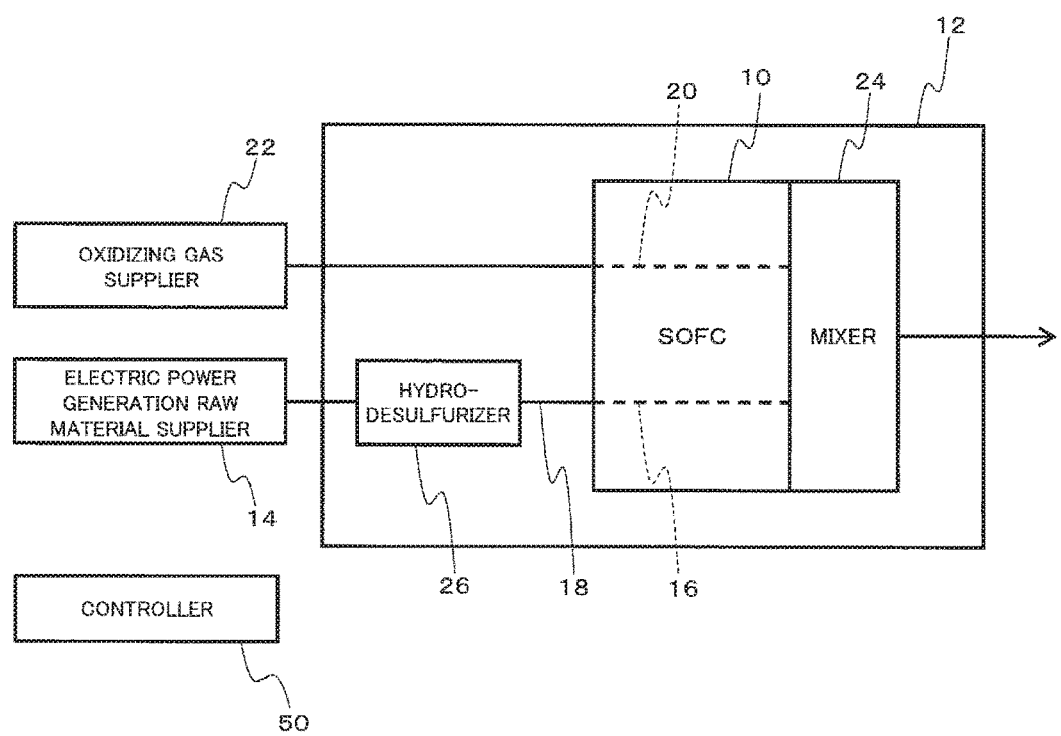
FIG. 6 is a block diagram showing one example of a schematic configuration of the solid-oxide fuel cell system according to Embodiment 3.

FIG. 6 is a block diagram showing one example of a schematic configuration of the solid-oxide fuel cell system according to Embodiment 3. Hereinafter, a solid-oxide fuel cell system 3 of Embodiment 3 will be explained in reference to FIG. 6.

In an example shown in FIG. 6, the solid-oxide fuel cell system 3 includes a hydro-desulfurizer 26.

The hydro-desulfurizer 26 removes the sulfur compound in the electric power generation raw material supplied from the electric power generation raw material supplier 14. In an example shown in FIG. 6, the hydro-desulfurizer 26 is disposed on the combustible gas channel 18 extending from the electric power generation raw material supplier 14 to the solid-oxide fuel cell 10.

The solid-oxide fuel cell 10 may generate electric power by using the electric power generation raw material desulfurized by the hydro-desulfurizer 26 or may generate electric power by using a reformed gas obtained by reforming, by the reformer or the like, the electric power generation raw material desulfurized by the hydro-desulfurizer 26.

The hydro-desulfurizer 26 is configured such that a hydrodesulfurizing agent is filled in a container. Used as the hydrodesulfurizing agent is, for example, a CuZn-based catalyst having both a function of converting the sulfur compound into hydrogen sulfide and a function of adsorbing the hydrogen sulfide. However, the hydrodesulfurizing agent is not limited to this and may be constituted by: a CoMo-based catalyst that converts the sulfur compound of the raw material gas into the hydrogen sulfide; and a ZnO-based catalyst or CuZn-based catalyst that is provided downstream of the CoMo-based catalyst and is a sulfur adsorbent which adsorbs and removes the hydrogen sulfide.

After the electric power generation of the fuel cell unit 12 is stopped, the controller 50 controls the electric power generation raw material supplier 14 to supply to the combustible gas channel 18 the electric power generation raw material, the amount of which compensates for the contraction of the gas in the combustible gas channel 18 due to the temperature decrease of the fuel cell unit 12, and also controls the oxidizing gas supplier 22 to supply the oxidizing gas to the cathode gas channel 20 in accordance with the supply of the electric power generation raw material. After the electric power generation is stopped, the electric power generation raw material supplied from the electric power generation raw material supplier 14 flows through the hydro-desulfurizer 26 into the solid-oxide fuel cell 10.

According to this control, even if the gas in the combustible gas channel 18 contracts due to the temperature decrease of the fuel cell unit 12 after the electric power generation of the fuel cell unit 12 is stopped, the electric power generation raw material is supplied to the combustible gas channel 18. Therefore, the oxidizing gas is less likely to flow backward to the combustible gas channel 18, and the possibility of the deterioration of the catalyst in the hydro-desulfurizer 26 by oxidation can be reduced.

Except for the above, the solid-oxide fuel cell system 3 of Embodiment 3 may be the same as the solid-oxide fuel cell system of Embodiment 1 shown in FIG. 1. Therefore, the same reference signs and names are used for the components that are common between FIGS. 6 and 1, and detailed explanations thereof are omitted.

Stopping Method

Figure 7:
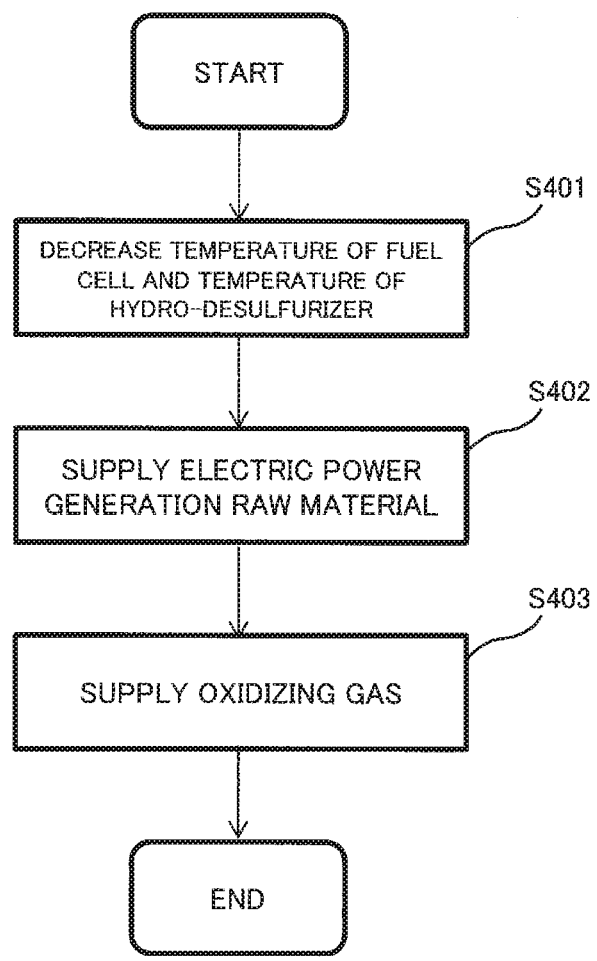
FIG. 7 is a flow chart showing one example of the method of stopping the solid-oxide fuel cell system according to Embodiment 3.

FIG. 7 is a flow chart showing one example of the method of stopping the solid-oxide fuel cell system according to Embodiment 3. Hereinafter, the method of stopping the solid-oxide fuel cell system according to Embodiment 3 will be explained in reference to FIG. 7. The stopping method shown in FIG. 7 may be executed in such a manner that, for example, the controller 50 controls the electric power generation raw material supplier 14 and the oxidizing gas supplier 22.

When the electric power generation of the fuel cell unit 12 is stopped (START), the temperature of the solid-oxide fuel cell 10 and the temperature of the hydro-desulfurizer 26 decrease (Step S401), and the electric power generation raw material supplier 14 supplies to the combustible gas channel 18 the electric power generation raw material, the amount of which compensates for the contraction of the gas in the combustible gas channel 18 due to the temperature decrease (Step S402). Further, in accordance with the supply of the electric power generation raw material to the combustible gas channel 18, the oxidizing gas supplier 22 supplies the oxidizing gas to the cathode gas channel 20 (Step S403). Then, the stop operation terminates (END).

The order of the supply of the electric power generation raw material (Step S402) and the supply of the oxidizing gas (Step S403) is not especially limited. The latter may be started before the former, or both the former and the latter may be started simultaneously.

Embodiment 3 may be modified in the same manner as Embodiments 1 and 2.

Example 2

Figure 8:
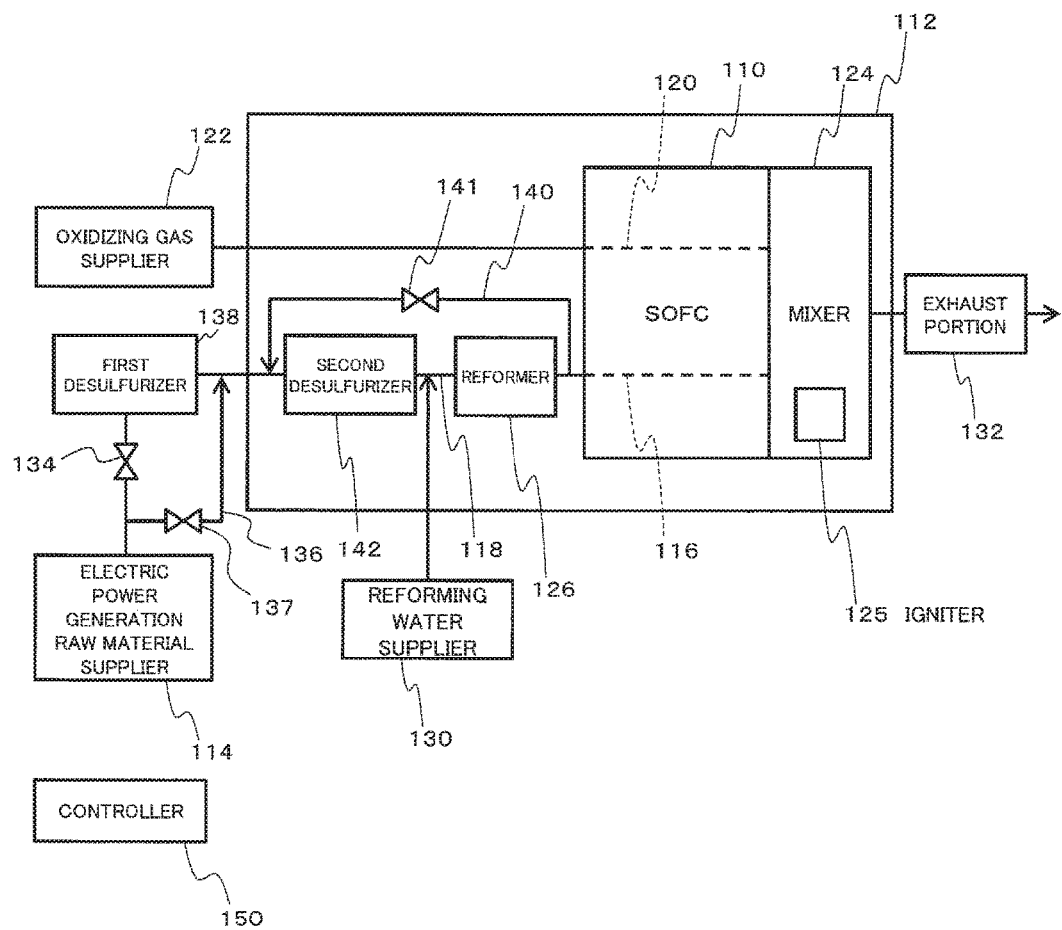
FIG. 8 is a block diagram showing a schematic configuration of the solid-oxide fuel cell system according to Example 2.

FIG. 8 is a block diagram showing a schematic configuration of the solid-oxide fuel cell system according to Example 2. Hereinafter, a solid-oxide fuel cell system 200 according to Example 2 will be explained in reference to FIG. 8.

In an example shown in FIG. 8, the solid-oxide fuel cell system 200 includes a first valve 134, a bypass channel 136, a second valve 137, a first desulfurizer 138, a recycled gas channel 140, a third valve 141, a second desulfurizer 142, and an igniter 125.

The first valve 134 is a valve that is disposed on the combustible gas channel 118 extending from the electric power generation raw material supplier 114 to the first desulfurizer 138 and opens and closes the combustible gas channel 118. The first valve 134 may be opened or closed by the controller 150.

The bypass channel 136 is a channel that branches from the combustible gas channel 118 extending from the electric power generation raw material supplier 114 to the first valve 134 and is connected to a downstream side of the first desulfurizer 138 without passing through the first desulfurizer 138.

The second valve 137 is a valve that is disposed on the bypass channel 136 and opens and closes the bypass channel 136. The second valve 137 may be opened and closed by the controller 150.

The first desulfurizer 138 is a normal temperature desulfurizer that removes the sulfur compound in the raw material at normal temperature. The first desulfurizer 138 may be provided outside the fuel cell unit 112. Since the normal temperature desulfurizer may be the same in configuration as that described in Embodiment 1, a detailed explanation thereof is omitted.

The recycled gas channel 140 is a channel that branches from the combustible gas channel 118 extending from the reformer 126 to the solid-oxide fuel cell 110 and is connected to the combustible gas channel 118 extending from the bypass channel 136 to the second desulfurizer 142.

The third valve 141 is a valve that is disposed on the recycled gas channel 140 and opens and closes the recycled gas channel 140. The third valve 141 may be opened and closed by the controller 150.

The second desulfurizer 142 is a hydro-desulfurizer. The second desulfurizer 142 may be provided outside the fuel cell unit 112. Since the hydro-desulfurizer may be the same in configuration as that described in Embodiment 1 or 2, a detailed explanation thereof is omitted.

For example, the igniter 125 is provided inside the mixer 124 and combusts a mixture gas obtained by mixing the anode off gas and the cathode off gas in the mixer 124. The ignition of the igniter 125 may be controlled by the controller 150.

In this case, the mixer 124 and the igniter 125 may constitute a combustor. The combustor mixes the anode off gas and the cathode off gas and combusts them. The combustor may be configured to be able to heat the reformer using combustion heat and heat of a flue gas.

Except that the desulfurizer 128 is omitted in addition to the above, the solid-oxide fuel cell system 200 may be the same in configuration as the solid-oxide fuel cell system 100 of Example 1. Therefore, the same reference signs and names are used for the components that are common between FIGS. 3 and 8, and detailed explanations thereof are omitted.

Figure 9:
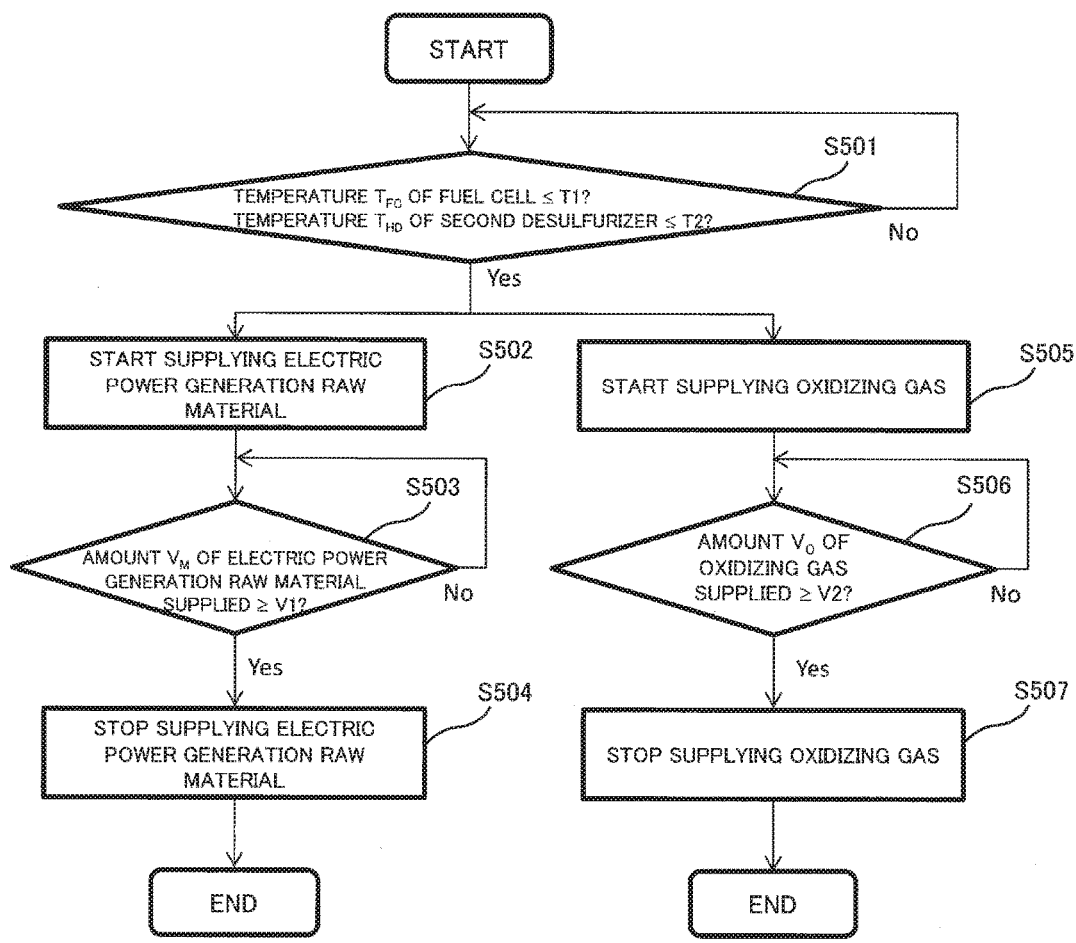
FIG. 9 is a flow chart showing the method of stopping the solid-oxide fuel cell system according to Example 2.

FIG. 9 is a flow chart showing a method of stopping the solid-oxide fuel cell system according to Example 2. Hereinafter, the method of stopping the solid-oxide fuel cell system according to Example 2 will be explained in reference to FIG. 9. The stopping method shown in FIG. 9 may be executed in such a manner that, for example, the controller 150 controls the electric power generation raw material supplier 114 and the oxidizing gas supplier 122.

When the electric power generation of the fuel cell unit 112 is stopped (START), the supply of the electric power generation raw material and the supply of the oxidizing gas are stopped. Specifically, for example, the stop of the electric power generation may be stop of extraction of the electric power from the fuel cell unit 112. After a predetermined period of time (several minutes, for example) since the stop of the supply of the electric power generation raw material, the supply of the oxidizing gas may be stopped.

Then, when the temperature $T_{FC}$ of the solid-oxide fuel cell 110 becomes not more than the temperature T1, and a temperature $T_{HD}$ of the second desulfurizer 142 (hydro-desulfurizer) becomes not more than a temperature T2 (Yes in Step S501), the supply of the electric power generation raw material to the combustible gas channel 118 by the electric power generation raw material supplier 114 is started (Step S502), and the supply of the oxidizing gas to the cathode gas channel 120 by the oxidizing gas supplier 122 is started (Step S505). It should be noted that the order of the start of the supply of the electric power generation raw material and the start of the supply of the oxidizing gas is not especially limited.

After that, when the amount $V_M$ of electric power generation raw material supplied becomes not less than the amount V1 (Yes in Step S503), the supply of the electric power generation raw material is stopped (Step S504). The amount V1 may be a predetermined threshold that is not more than the volume of the anode gas channel 116 of the solid-oxide fuel cell 110 or may be a predetermined threshold that is not more than the volume of the combustible gas channel 118. For example, the amount $V_M$ of electric power generation raw material supplied may be calculated from an operation amount output to the electric power generation raw material supplier 114 and an accumulated time.

Further, when the amount $V_O$ of oxidizing gas supplied becomes not less than the amount V2 (Yes in Step S506), the supply of the oxidizing gas is stopped (Step S507). The amount V2 may be a predetermined threshold that is not less than the volume of the cathode gas channel 120 of the solid-oxide fuel cell 110. For example, the amount $V_O$ of oxidizing gas supplied may be calculated from an operation amount output to the oxidizing gas supplier 122 and an accumulated time.

At least one of the determination (Step S503) regarding the amount $V_M$ and the determination (Step S506) regarding the amount $V_O$ may be performed using a physical quantity correlated to the amount ($V_M$ or $V_O$). One example of the physical quantity may be a time elapsed since the start of the supply.

When the supply of the electric power generation raw material and the supply of the oxidizing gas are stopped, the stop operation terminates (END).

It should be noted that, for example, until the temperature $T_{FC}$ of the solid-oxide fuel cell 110 becomes lower than a predetermined temperature, the supply of the electric power generation raw material in Steps S502 to S504 and the supply of the oxidizing gas in Steps S505 to S507 may be repeatedly performed. The supply of the electric power generation raw material in Steps S502 to S504 may be repeatedly performed while continuing the supply of the oxidizing gas.

Embodiment 4

The solid-oxide fuel cell system of Embodiment 4 is configured such that in the solid-oxide fuel cell system of Embodiment 3, the controller controls the oxidizing gas supplier to keep on supplying the oxidizing gas to the cathode gas channel even after the supply of the electric power generation raw material to the combustible gas channel is stopped after the electric power generation of the fuel cell unit is stopped.

According to this configuration, the durability of the solid-oxide fuel cell system can be improved.

Device Configuration

The solid-oxide fuel cell system of Embodiment 4 may be the same in device configuration as the solid-oxide fuel cell system 3 of Embodiment 3 shown in FIG. 6 except for the operations of the controller. Therefore, the same reference signs and names are used for the components that are common between Embodiments 3 and 4, and detailed explanations thereof are omitted.

Stopping Method

Figure 10:
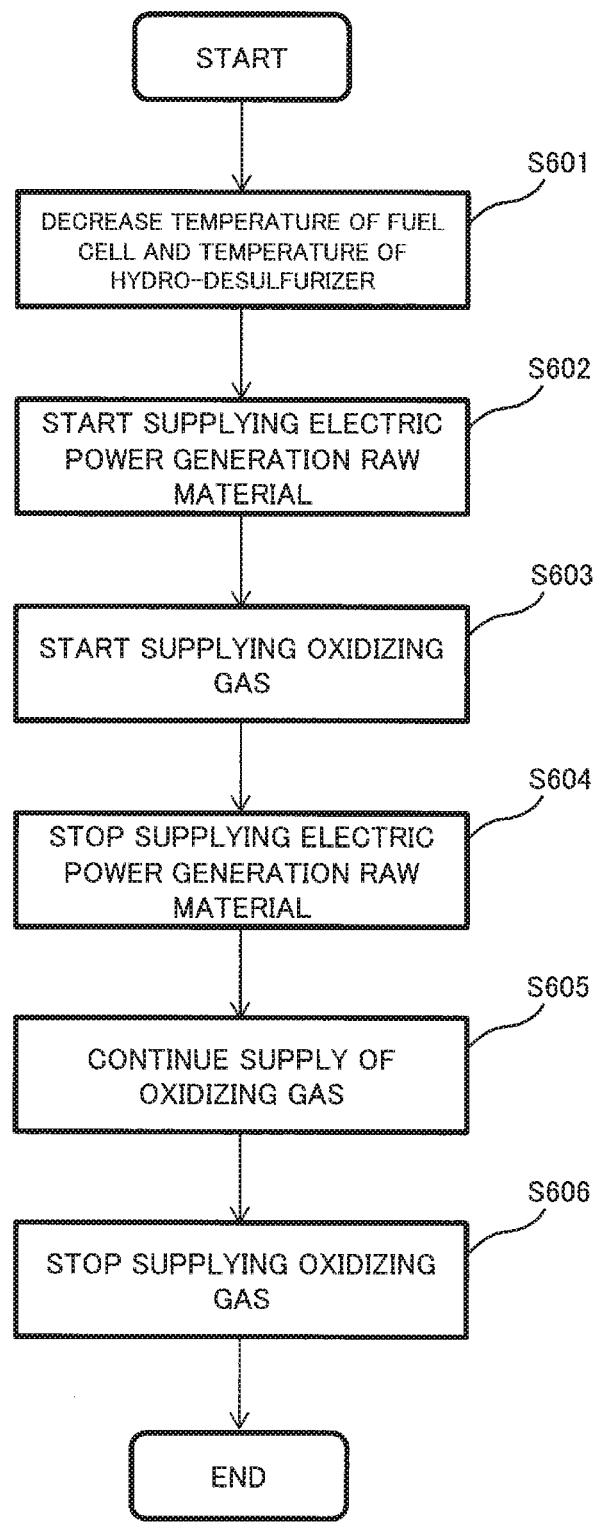
FIG. 10 is a flow chart showing one example of the method of stopping the solid-oxide fuel cell system according to Embodiment 4.

FIG. 10 is a flow chart showing one example of the method of stopping the solid-oxide fuel cell system according to Embodiment 4. Hereinafter, the method of stopping the solid-oxide fuel cell system according to Embodiment 4 will be explained in reference to FIG. 10. The stopping method shown in FIG. 10 may be executed in such a manner that, for example, the controller 50 controls the electric power generation raw material supplier 14 and the oxidizing gas supplier 22.

When the electric power generation of the fuel cell unit 12 is stopped (START), the temperature of the solid-oxide fuel cell 10 and the temperature of the hydro-desulfurizer 26 decrease (Step S601), and the electric power generation raw material supplier 14 supplies to the combustible gas channel 18 the electric power generation raw material, the amount of which compensates for the contraction of the gas in the combustible gas channel 18 due to the temperature decrease (Step S602). Further, in accordance with the supply of the electric power generation raw material to the combustible gas channel 18, the oxidizing gas supplier 22 starts the supply of the oxidizing gas to the cathode gas channel 20 (Step S603).

After that, when a predetermined condition is satisfied, the supply of the electric power generation raw material is stopped (Step S604), but the supply of the oxidizing gas is continued (Step S605). The predetermined condition in Step S604 may be, for example, a condition that the amount of electric power generation raw material supplied reaches a predetermined threshold. The predetermined threshold in this case may be a predetermined threshold that is not more than the volume of the anode gas channel 16 of the solid-oxide fuel cell 10 or may be a predetermined threshold that is not more than the volume of the combustible gas channel 18. For example, the amount of electric power generation raw material supplied may be calculated from an operation amount output to the electric power generation raw material supplier 14 and an accumulated time.

After that, when a predetermined condition is satisfied, the supply of the oxidizing gas is stopped (Step S606). Then, the stop operation terminates (END). The predetermined condition in Step S606 may be, for example, a condition that the amount of oxidizing gas supplied reaches a predetermined threshold. The predetermined threshold in this case may be a predetermined threshold that is not less than the volume of the cathode gas channel 120 of the solid-oxide fuel cell 110. For example, the amount of oxidizing gas supplied may be calculated from an operation amount output to the oxidizing gas supplier 22 and an accumulated time.

The order of the start of the supply of the electric power generation raw material (Step S602) and the start of the supply of the oxidizing gas (Step S603) is not especially limited. The latter may be started before the former, or both the former and the latter may be started simultaneously.

Embodiment 4 may be modified in the same manner as Embodiments 1, 2, and 3.

Example 3

The solid-oxide fuel cell system of Example 3 will be explained. The solid-oxide fuel cell system of Example 3 may be the same in device configuration as that of Example 1 (FIG. 3) except that the mixer 124 serves as a combustor. Therefore, the same reference signs and names are used for the components that are common between Examples 3 and 1, and detailed explanations thereof are omitted.

Hereinafter, a stop sequence of the solid-oxide fuel cell system of Example 3 will be explained.

In the solid-oxide fuel cell system of Example 3, the electric power generation is stopped at the same time as the start of the stop operation. Then, the supply of the raw material and reforming water which have been continuously supplied during the electric power generation is stopped. Then, the supply of the oxidizing gas for the electric power generation is continued for a predetermined period of time (five minutes, for example) at a predetermined flow rate (20 NL/minute, for example). After the predetermined period of time, the supply of the oxidizing gas is stopped. Purposes of supplying the air as the oxidizing gas for the predetermined period of time at the predetermined flow rate are as below.

To be specific, the solid-oxide fuel cell system of Example 3 utilizes the water to cause the reforming reaction for generating the hydrogen-containing gas. At the time when the stop operation is started, the water remains in pipes. When the remaining water is vaporized by remaining heat, reducing gas such as hydrogen ($H_2$) in the combustible gas channel is discharged. Thus, there is a possibility that the reducing gas flows toward the cathode of the fuel cell to reduce members constituting the cathode, and for example, the cathode is peeled off from the electrolyte, and as a result, the durability of the fuel cell deteriorates. To reduce this possibility, according to the solid-oxide fuel cell system of Example 3, the discharged reducing gas is combusted by the oxidizing gas. After the discharge of the reducing gas in the combustible gas channel terminates, the supply of the oxidizing gas is stopped.

As above, after the electric power generation is stopped, the combustible gas containing steam remains in the channels through which the raw material and the combustible gas obtained by reforming the raw material flow. The fuel cell is maintained at a high temperature of 500 to 900° C. during the electric power generation and is gradually cooled after the stop.

In the cooling process, as the temperature of the high-temperature gas decreases, internal pressure decreases. When the solid-oxide fuel cell system is an open type system, air intrudes into the system so as to compensate for the reduction in the internal pressure.

Further, there is a possibility that when the temperature of the combustible gas containing steam becomes not more than a dew point, the steam condenses into water, and this significantly deteriorates the durability of the catalyst in the combustible gas channel, the durability of the anode electrode containing nickel (Ni), and the like. Therefore, when the temperature of the solid-oxide fuel cell 110 (stack) becomes not more than the predetermined temperature T1 (300° C., for example), the raw material gas is supplied to the anode gas channel 116. By reducing the intrusion of the air into the anode gas channel 116, the oxidation of the anode electrode and the like in the fuel cell unit 112 can be suppressed.

Further, there is a possibility that when the raw material gas is supplied, the reducing gas discharged from the combustible gas channel 118 flows toward the cathode, as with a case where the stop operation of the solid-oxide fuel cell system is started. Therefore, the supply of the oxidizing gas is started before the supply of the raw material gas.

When the amount of raw material gas supplied is substantially the same as the volume of the combustible gas channel, that is, even when the amount of raw material gas supplied is actually less than the volume of the combustible gas channel, the intrusion of the air can be substantially suppressed. Even if a small amount of air intrudes, oxygen is consumed by a reaction between the air and the combustible gas remaining in the combustible gas channel, and nitrogen and the combustible gas remain. Therefore, the oxidative degradation of an electrode or catalyst in the combustible gas channel can be suppressed. To be specific, the oxidative degradation can be reduced by supplying the raw material gas (pressure compensating operation) to compensate for the decrease in the internal pressure of the combustible gas channel due to the temperature decrease.

The possibility of the performance deterioration by the deposition of carbon from the raw material gas at the anode of the fuel cell can be reduced in such a manner that the temperature (T1) at which the supply of the raw material gas is started is set to less than 300° C. Further, even when Ni is used in the anode electrode, the possibility of the catalyst deterioration can be reduced in such a manner that the temperature T1 is set to more than 150° C. Therefore, the temperature T1 may be set to more than 150° C. and less than 300° C.

After a predetermined amount of raw material gas is supplied, the pressure compensating operation is terminated, and the supply of the raw material gas is stopped. In the cooling process of the solid-oxide fuel cell system, the decrease in the internal pressure by the volume contraction of the gas and the condensation of the steam in the combustible gas channel may occur at a plurality of members in a plurality of temperature ranges (for example, regarding the condensation of the steam, the decrease in the internal pressure occurs in a temperature range defined when the temperature of a member is around 100° C.).

When the temperature of the fuel cell unit 12 is a low temperature such as not more than about 150° C., and the air intrudes without performing the pressure compensating operation, the catalyst or anode in the fuel cell unit 112 is less likely to be oxidized. Therefore, the problem of the durability deterioration is little. When supplying the raw material gas, the oxidizing gas is simultaneously supplied to the cathode gas channel 120 to prevent the reducing gas from flowing toward the cathode as described above. For example, the oxidizing gas is supplied at a predetermined flow rate for a predetermined period of time (for example, at a flow rate of 10 L/minute for two minutes, that is, 20 L) such that the amount thereof becomes a predetermined amount larger than the volume (10 L, for example) of the cathode gas channel.

More than the above predetermined amount of oxidizing gas is supplied until the temperature of the solid-oxide fuel cell 110 (stack) decreases to the temperature T2 (90° C., for example). The steam in the cathode gas channel 120 is discharged by the supply of the oxidizing gas. Further, the amount of oxidizing gas supplied may be set to an amount by which the mixture gas mixed in the mixer during the supply of the raw material gas is outside the combustible range. For example, a combustion lower limit of the city gas (13A gas) is 4.3% (volume concentration). Therefore, when the electric power generation raw material is the city gas (13A gas), the volume concentration may be not more than 4.3%. When the 13A gas is supplied at a flow rate of 1 L/minute, and the oxidizing gas is air, the air may be supplied at a flow rate of not less than 22.3 L/minute. In consideration that the combustion easily occurs since the fuel cell unit has a high temperature of about 300° C. even during the cooling, and in addition, in consideration of safety factors and the like, the flow rate of the air may be about twice to four times 22.3 L/minute, that is, 45 L/minute to 70 L/minute.

In Modified Example (see FIG. 8) in which the hydro-desulfurizer is added to Example 3, an appropriate use temperature range of the hydro-desulfurizer is 150 to 350° C. As described above, when the raw material gas is supplied at a temperature of not more than 150° C. during the stop operation, the catalyst deterioration may occur, and therefore, extra care is needed. The control operations may be performed based on any one of the temperatures of the desulfurizer, the reformer, and the fuel cell or a combination of a plurality of temperatures among the temperatures of the desulfurizer, the reformer, and the fuel cell. The supply of the raw material gas may be started when a lowest one of the temperatures of the second desulfurizer 142, the reformer 126, and the solid-oxide fuel cell 110 in the fuel cell unit 112 becomes not more than the temperature T1 (when each of the temperatures of these three components satisfies a predetermined condition).

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

One aspect of the present disclosure is useful as a solid-oxide fuel cell system having higher durability than conventional fuel cell systems.

REFERENCE SIGNS LIST 1 solid-oxide fuel cell system
3 solid-oxide fuel cell system
10 solid-oxide fuel cell
12 fuel cell unit
14 electric power generation raw material supplier
16 anode gas channel
18 combustible gas channel
20 cathode gas channel
22 oxidizing gas supplier
24 mixer
26 hydro-desulfurizer
50 controller
100 solid-oxide fuel cell system
110 solid-oxide fuel cell
112 fuel cell unit
114 electric power generation raw material supplier
116 anode gas channel
118 combustible gas channel
120 cathode gas channel
122 oxidizing gas supplier
124 mixer
125 igniter
126 reformer
128 desulfurizer
130 reforming water supplier
132 exhaust portion
134 first valve
136 bypass channel
137 second valve
138 first desulfurizer
140 recycled gas channel
141 third valve
142 second desulfurizer
150 controller
200 solid-oxide fuel cell system

The invention claimed is:
1. A solid-oxide fuel cell system comprising:
a fuel cell unit including
a solid-oxide fuel cell including an anode gas channel and a cathode gas channel and
a mixer operative to mix an anode off gas discharged from the anode gas channel and a cathode off gas discharged from the cathode gas channel;
an electric power generation raw material supplier operative to supply an electric power generation raw material to the fuel cell unit;
a combustible gas channel extending from the electric power generation raw material supplier to a downstream end of the anode gas channel;
an oxidizing gas supplier operative to supply an oxidizing gas to the cathode gas channel; and
a controller operative to, after electric power generation of the fuel cell unit is stopped, control the electric power generation raw material supplier to supply to the combustible gas channel the electric power generation raw material, the amount of which compensates for contraction of a gas in the combustible gas channel due to temperature decrease of the fuel cell unit and also control the oxidizing gas supplier to supply the oxidizing gas to the cathode gas channel in accordance with the supply of the electric power generation raw material.

2. The solid-oxide fuel cell system according to claim 1, wherein after the electric power generation of the fuel cell unit is stopped, the controller controls the electric power generation raw material supplier and the oxidizing gas supplier to intermittently supply the electric power generation raw material and the oxidizing gas.

3. The solid-oxide fuel cell system according to claim 1, wherein after the electric power generation of the fuel cell unit is stopped, the mixer mixes the oxidizing gas and the electric power generation raw material, and the controller controls the electric power generation raw material supplier or the oxidizing gas supplier such that an amount of electric power generation raw material supplied becomes an amount by which a concentration of the electric power generation raw material in the mixer is outside a combustible range.

4. The solid-oxide fuel cell system according to claim 1, wherein after the electric power generation of the fuel cell unit is stopped, the controller controls the electric power generation raw material supplier such that a volume of the electric power generation raw material supplied to the combustible gas channel becomes not more than a volume of the combustible gas channel.

5. The solid-oxide fuel cell system according to claim 4, wherein the controller controls the oxidizing gas supplier such that a volume of the oxidizing gas supplied to the cathode gas channel after the electric power generation of the fuel cell unit is stopped becomes not less than a volume of the cathode gas channel.

6. The solid-oxide fuel cell system according to claim 4, wherein the controller controls the oxidizing gas supplier to keep on supplying the oxidizing gas to the cathode gas channel even after the supply of the electric power generation raw material to the combustible gas channel is stopped after the electric power generation of the fuel cell unit is stopped.

7. The solid-oxide fuel cell system according to claim 1, wherein the fuel cell unit includes a hydro-desulfurizer operative to remove a sulfur compound in the electric power generation raw material supplied from the electric power generation raw material supplier.

8. A method of stopping a solid-oxide fuel cell system, the method comprising the steps of:
stopping electric power generation of a fuel cell unit including a solid-oxide fuel cell; and
when a channel extending from an electric power generation raw material supplier to a downstream end of an anode gas channel of the solid-oxide fuel cell is a combustible gas channel and after electric power generation of the fuel cell unit is stopped, supplying to the combustible gas channel an electric power generation raw material, the amount of which compensates for contraction of a gas in the combustible gas channel due to temperature decrease of the fuel cell unit and also supplying an oxidizing gas to a cathode gas channel of the solid-oxide fuel cell in accordance with the supply of the electric power generation raw material.

* * * * *